(12) United States Patent
Nishikawa et al.

(10) Patent No.: US 8,939,501 B2
(45) Date of Patent: Jan. 27, 2015

(54) SEAT HEATER

(75) Inventors: Masanori Nishikawa, Shiga (JP); Norio Abe, Shiga (JP); Kazuaki Hioki, Shiga (JP); Hiroyuki Ogino, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 259 days.

(21) Appl. No.: 13/515,232

(22) PCT Filed: Nov. 19, 2010

(86) PCT No.: PCT/JP2010/006795
§ 371 (c)(1),
(2), (4) Date: Jun. 11, 2012

(87) PCT Pub. No.: WO2011/074184
PCT Pub. Date: Jun. 23, 2011

(65) Prior Publication Data
US 2012/0274104 A1 Nov. 1, 2012

(30) Foreign Application Priority Data
Dec. 14, 2009 (JP) ................................. 2009-282513

(51) Int. Cl.
*B60N 2/56* (2006.01)
*H05B 3/34* (2006.01)

(52) U.S. Cl.
CPC ............... *H05B 3/34* (2013.01); *B60N 2/5685* (2013.01); *H05B 2203/005* (2013.01); *H05B 2203/029* (2013.01)
USPC .................................................... 297/180.12

(58) Field of Classification Search
USPC .......................................... 297/180.12, 180.1
See application file for complete search history.

(56) References Cited

U.S. PATENT DOCUMENTS

| 7,134,715 B1* | 11/2006 | Fristedt et al. | 297/180.12 |
| 7,240,962 B2* | 7/2007 | Kim | 297/180.12 |
| 2009/0095725 A1* | 4/2009 | Ohashi et al. | 219/202 |

(Continued)

FOREIGN PATENT DOCUMENTS

| CN | 2838194 Y | 11/2006 |
| JP | 56-072715 A | 6/1981 |

(Continued)

OTHER PUBLICATIONS

International Preliminary Report on Patentability (English language translation) in corresponding International Application No. PCT/JP2010/006795, dated Jul. 19, 2012, 7 pages.

(Continued)

*Primary Examiner* — Milton Nelson, Jr.
(74) *Attorney, Agent, or Firm* — Brinks Gilson & Lione

(57) ABSTRACT

A seat heater includes first heat-generating elements embedded in a seat so as to correspond to first sites of a seat occupant, second heat-generating elements embedded in the seat so as to correspond to second sites of the seat occupant, and a controller for executing a fluctuation control in which a first set temperature of the first heat-generating elements and a second set temperature of the second heat-generating elements are increased or decreased in each of a plurality of predetermined time periods. The controller sets the first set temperature to be higher than the second set temperature in one of the time periods and sets the second set temperature to be higher than the first set temperature in another of the time periods.

9 Claims, 5 Drawing Sheets

(56) References Cited

U.S. PATENT DOCUMENTS

| | | |
|---|---|---|
| 2010/0130808 A1 | 5/2010 | Hattori |
| 2010/0176110 A1 | 7/2010 | Ogino et al. |
| 2011/0163576 A1* | 7/2011 | Akai et al. ............... 297/180.12 |

FOREIGN PATENT DOCUMENTS

| | | |
|---|---|---|
| JP | 02-129886 A | 5/1990 |
| JP | 10-027674 A | 1/1998 |
| JP | 11-304175 A | 11/1999 |
| JP | 2001-201073 A | 7/2001 |
| JP | 2007-283932 A | 11/2007 |
| JP | 2009-247634 A | 10/2009 |
| JP | 2009-269480 A | 11/2009 |
| JP | 2010-040185 A | 2/2010 |
| WO | WO 02/06913 A1 | 1/2002 |
| WO | WO 2008/155893 A1 | 12/2008 |

OTHER PUBLICATIONS

Search Report, and English translation thereof, in corresponding Chinese Application No. 201080056897.X, dated Dec. 16, 2013, 5 pages.

International Search Report for International Application No. PCT/JP2010/006795, dated Dec. 14, 2010, 2 pages.

* cited by examiner

SEAT HEATER

This application is a 371 application of PCT/JP2010/006795 having an international filing date of Nov. 19, 2010, which claims priority to JP2009-282513 filed Dec. 14, 2009, the entire contents of which are incorporated herein by reference.

TECHNICAL FIELD

The present invention relates to a heater embedded in a seat such as, for example, an automotive seat to heat the seat.

BACKGROUND ART

In a conventional seat heater, a planar heater includes an electric heating wire disposed on a base material over an entire surface thereof so as to wind therethrough at predetermined intervals. The planar heater is interposed between a skin and a main pad of both a seat cushion and a seat back of the seat. When the electric heating wire is energized, the heater generates heat to make a seat occupant warm and comfortable even in a cold season (see, for example, Patent Document 1).

Another seat heater has been proposed having a plurality of separated heating elements embedded in the seat. The heating elements are selectively energized to generate heat depending on seat-occupant's symptoms to be ameliorated. This heater is used to locally heat seat-occupant's sites associated with the symptoms to ameliorate them (see, for example, Patent Document 2).

Patent Document 1: Japanese Laid-Open Patent Publication No. 2-129886

Patent Document 2: Japanese Laid-Open Patent Publication No. 2007-283932

SUMMARY OF THE INVENTION

Problems to be Solved by the Invention

Recently, electric appliances used in an automotive vehicle are diversified, which in turn increases electric power consumption in the automotive vehicle. On the other hand, a reduction in electric power consumption of the electric appliances is demanded for improvement of fuel efficiency of the automotive vehicle.

Also, a recent environment-responsive automotive vehicle such as, for example, a hybrid vehicle or an electric vehicle includes an electrical system having an increased number of controllers, and a further reduction in electric power consumption becomes indispensable.

However, in the seat heater as disclosed in Patent Document 1, because the electric heating wire is disposed over an entire surface of the base material so as to wind therethrough at the predetermined intervals, a portion of the electric heating wire disposed on a corresponding portion (portion that need not be heated) of the base material that is not in contact with the seat occupant is also energized, which in turn causes unnecessary heat dissipation, thus posing a problem of not contributing to energy saving.

In the case of the heating elements as disclosed in Patent Document 2, only selected ones are energized and, hence, an improper selection causes a shortage of a heating area, thereby spoiling comfort of the seat occupant.

The present invention has been developed to overcome the above-described disadvantages.

It is accordingly an objective of the present invention to provide a seat heater capable of achieving energy saving while keeping comfort.

Means to Solve the Problems

In accomplishing the above objective, the seat heater according to the present invention includes: a first heat generator embedded in a seat; a second heat generator embedded in the seat at a location different from the first heat generator; and a controller operable to execute a fluctuation control in which a first set temperature of the first heat generator and a second set temperature of the second heat generator are increased or decreased in each of a plurality of predetermined time periods; wherein the controller sets the first set temperature to be higher than the second set temperature in one of the time periods and sets the second set temperature to be higher than the first set temperature in another of the time periods.

In the seat heater according to the present invention, either the first heat generator or the second heat generator is placed so as to be brought into contact with seat-occupant's sites that are effective in terms of a sensible temperature, and the set temperatures of both the heat generators are determined as described above. Accordingly, a set temperature of the heater can be dropped as a whole without dropping the sensible temperature, thus resulting in a reduction in electric power consumption and making it possible to provide a seat heater capable of achieving energy saving while keeping comfort.

EFFECTS OF THE INVENTION

The seat heater according to the present invention executes the fluctuation control to increase or decrease the set temperatures of the first heat generator and the second heat generator in each of the plurality of predetermined time periods, taking into account differences in feeling of warmth. This control can reduce heat-generating energy to realize energy saving without spoiling comfort.

DETAILED DESCRIPTION OF THE PREFERRED EMBODIMENTS

Figure 1:
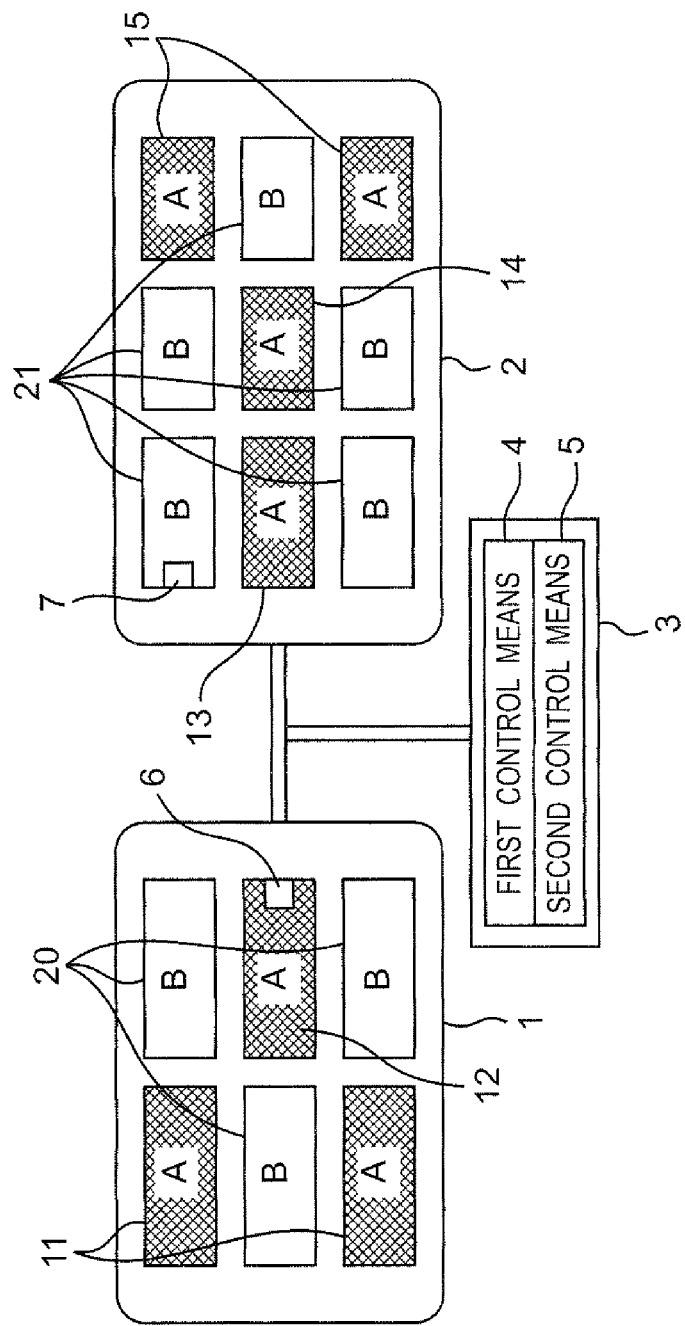
FIG. 1 is a schematic view showing a construction of a seat heater according to a first embodiment of the present invention.

The seat heater according to the present invention includes: a first heat generator embedded in a seat; a second heat generator embedded in the seat at a location different from the first heat generator; and a controller operable to execute a fluctuation control in which a first set temperature of the first heat generator and a second set temperature of the second heat generator are increased or decreased in each of a plurality of predetermined time periods; wherein the controller sets the first set temperature to be higher than the second set temperature in one of the time periods and sets the second set temperature to be higher than the first set temperature in another of the time periods.

In this invention, for example, the first heat generator is placed so as to be brought into contact with seat-occupant's sites that are effective in terms of a sensible temperature, and the controller sets the first set temperature and the second set temperature in a manner as described above. Accordingly, a set temperature of the heater can be dropped as a whole without dropping the sensible temperature of the seat occupant, thus resulting in a reduction in electric power consumption and making it possible to provide a seat heater capable of achieving energy saving while keeping comfort.

The first heat generator and the second heat generator are placed at different locations of the seat depending on properties of seat-occupant's sites. By way of example, the first heat generator is placed so as to be brought into contact with at least one of thighs, a central portion of a hip, a central portion of a waist, a central portion of a back, and shoulders of the seat occupant. In general, a human body includes sites that are quick to sense warmth and show a high heating effect in response to heat supply and also includes sites that are slow to sense warmth and accordingly insensitive to warmth, but can enhance comfort when heated. By making use of the properties of the sites of the human body and bringing the first heat generator and the second heat generator into contact with those sites of the human body that are effective in body sense, more efficient heating can be conducted.

A time average value of the second set temperature in a predetermined number of the time periods is less than that of the first set temperature in the predetermined number of the time periods. By way of example, the time average value is dropped with respect to the sites that are slow to sense warmth and accordingly insensitive to warmth, but can enhance comfort when heated, thus making it possible to reduce heat-generating energy to realize further energy saving without spoiling comfort.

Also, the controller executes a normal control in which the first heat generator and the second heat generator are energized with a target value of the first set temperature and that of the second set temperature set as a predetermined reference set temperature and, in the fluctuation control, each of the first set temperature and the second set temperature does not exceed the predetermined reference set value. The fluctuation control keeps the first set temperature and the second set temperature from exceeding the reference set temperature, thereby enhancing an energy saving performance.

For example, the normal control is executed from start of energization of the first heat generator and the second heat generator until a predetermined time period elapses, and the fluctuation control is executed after the normal control. If quick temperature-increasing characteristics at the start of energization are required, normal energization is first executed and the fluctuation control is subsequently executed, thereby making it possible to further enhance comfort and the energy saving performance.

Again, for example, the normal control is executed until the first set temperature reaches a predetermined set temperature and the fluctuation control is executed after the normal control. If the quick temperature-increasing characteristics at the start of energization are required, the normal energization is first executed and the fluctuation control is executed after the temperature has stabilized, thus making it possible to reduce heat-generating energy to realize energy saving without spoiling feeling of warmth at the start of energization.

Supplementarily, when a non-energized state of both the first heat generator and the second heat generator continues for a predetermined first time period, the controller energizes the first heat generator for a predetermined second time period. Because the seat-occupant's feeling of warmth is likely to diminish if neither the first heat generator nor the second heat generator is energized, the first heat generator is forcibly energized after a lapse of the predetermined time period, thereby making it possible to realize a comfortable seat heater without diminishing the feeling of warmth.

Embodiments of the present invention are described hereinafter with reference to the drawings, but the present invention is not limited by the embodiments.

(Embodiment 1)

A first embodiment of the present invention is explained hereinafter with reference to FIGS. 1 to 3.

Figure 2:
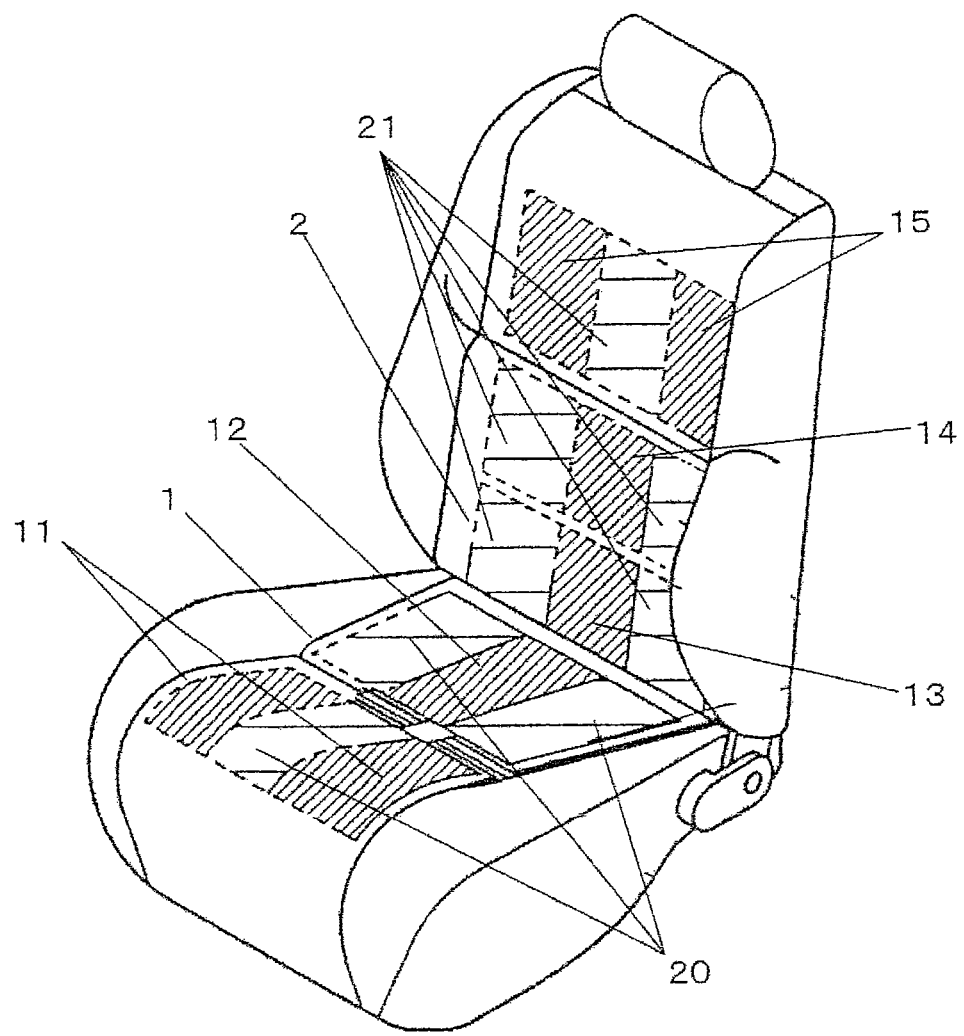
FIG. 2 is a perspective view of an automotive seat having the seat heater of FIG. 1 embedded therein.

FIG. 1 is a schematic view showing a construction of a seat heater according to the first embodiment of the present invention, and FIG. 2 is a perspective view of an automotive seat having the seat heater of FIG. 1 embedded therein.

As shown in FIGS. 1 and 2, the seat heater is embedded in, for example, an automotive seat and includes a planar heat-generating portion 1 for a cushion (that is, a seat cushion), a planar heat-generating portion 2 for a back (that is, a seat back), and a controller 3 operable to control energization of the planar heat-generating portion 1 for the seat cushion and that of the planar heat-generating portion 2 for the seat back. Specifically, the planar heat-generating portion 1 for the seat cushion includes a plurality of planar heat-generating elements 11 placed so as to be brought into contact with seat-occupant's thighs, a planar heat-generating element 12 placed so as to be brought into contact with a central portion of a seat-occupant's hip, and a plurality of planar heat-generating elements 20 placed in other portions of the seat cushion. On the other hand, the planar heat-generating portion 2 for the seat back includes a planar heat-generating element 13 placed so as to be brought into contact with a central portion of a seat-occupant's waist, a planar heat-generating element 14 placed so as to be brought into contact with a central portion of a seat-occupant's back, a plurality of planar heat-generating elements 15 placed so as to be brought into contact with seat-occupant's shoulders, and a plurality of planar heat-generating elements 21 placed in other portions of the seat back.

Each of the planar heat-generating elements includes an electric heating wire disposed on a base material such as, for example, non-woven fabric so as to wind therethrough at predetermined intervals. The controller 3 is made up of, for example, a microcomputer and includes a first control means 4 operable to control energization of a first heat generator A made up of the planar heat-generating elements 11, 12, 13, 14, 15 and a second control means 5 operable to control energization of a second heat generator B made up of the planar heat-generating elements 20, 21 placed in other portions. In addition, a first temperature detecting means 6 for detecting a temperature of the first heat generator A and a second temperature detecting means 7 for detecting a temperature of the second heat generator B are provided.

Operation and function of the seat heater of the above-described construction are explained hereinafter.

Each of the planar heat-generating portion 1 for the seat cushion and the planar heat-generating portion 2 for the seat back includes two kinds of regions separated from each other, one region including the first heat generator A and the other region including the second heat generator B. Of the sites of a human body to be brought into contact with a seat, the one region is intended to heat the sites including thighs, a central portion of a hip, a central portion of a waist, a central portion of a back, and shoulders, all of which are quick to sense warmth and show a high heating effect in response to heat supply, while the other region is intended to heat the sites other than the aforementioned ones, which are slow to sense warmth and accordingly insensitive to warmth, but can enhance comfort when heated. In this manner, the first heat generator A and the second heat generator B are placed at different locations of the seat depending on the properties of the seat-occupant's sites.

As described above, the controller 3 includes the first control means 4 for controlling energization of the first heat generator A and the second control means 5 for controlling energization of the second heat generator B. If the temperature of the first heat generator A detected by the first temperature detecting means 6 reaches a predetermined reference set temperature, the first control means 4 controls the first heat generator A to be turned off (non-energized state), and if the temperature of the first heat generator A detected by the first temperature detecting means 6 does not reach the predetermined reference set temperature, the first control means 4 controls the first heat generator A to be turned on (energized state). On the other hand, if the temperature of the second heat generator B detected by the second temperature detecting means 7 reaches the predetermined reference set temperature, the second control means 5 controls the second heat generator B to be turned off, and if the temperature of the second heat generator B detected by the second temperature detecting means 7 does not reach the predetermined reference set temperature, the second control means 5 controls the second heat generator B to be turned on. The reference set temperature can be arbitrarily set by the seat occupant using, for example, a dial or may be determined by the controller 3 in advance.

The present invention is characterized by a fluctuation control, which is explained hereinafter.

Figure 3:
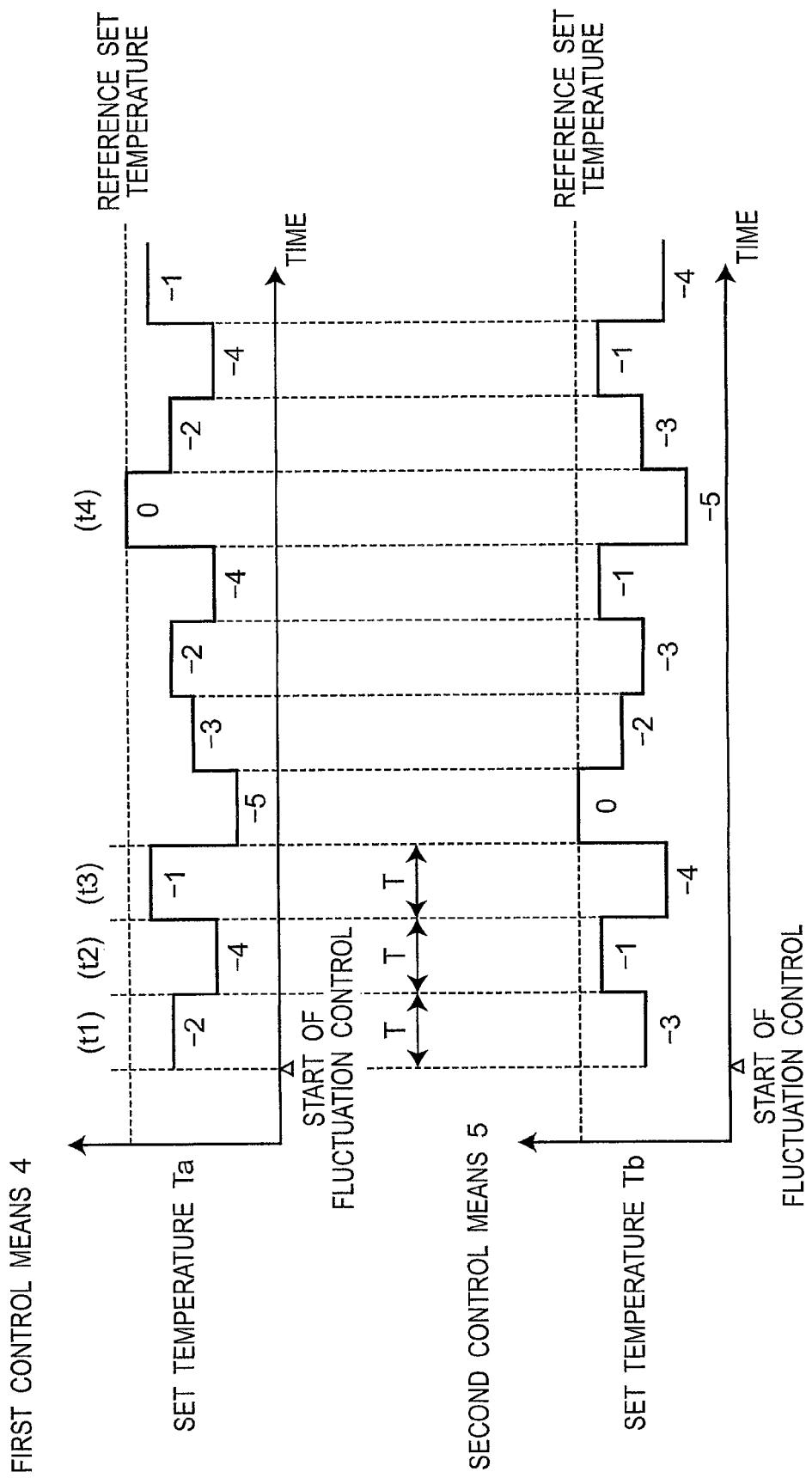
FIG. 3 is a schematic view showing a fluctuation control executed by a controller shown in FIG. 1.

FIG. 3 is a schematic view showing the fluctuation control executed by the controller shown in FIG. 1.

An upper illustration of FIG. 3, i.e., FIG. 3(a) depicts a change in set temperature Ta of the first heat generator A (hereinafter referred to as a first set temperature) that is set by the first control means 4, and a lower illustration of FIG. 3, i.e., FIG. 3(b) depicts a change in set temperature Tb of the second heat generator B (hereinafter referred to as a second set temperature) that is set by the second control means 5.

In the example of FIG. 3, the first control means 4 and the second control means 5 change the first set temperature Ta and the second set temperature Tb, respectively, for every predetermined time period (T), for example, about five minutes. In each predetermined time period, the first control means 4 and the second control means 5 control energization of the first heat generator A and that of the second heat generator B depending on the first set temperature Ta and the second set temperature Tb, respectively.

More specifically, assuming that the first control means 4 has been, for example, programmed in advance to make, when the reference set temperature is 40° C., a temperature drop −2° C. with respect to the reference set temperature in a first time period (t1) of the fluctuation control, the first control means 4 sets the first set temperature Ta to 38° C. in this time period (t1) to control energization of the first heat generator A. Also, assuming that the first control means 4 has been, for example, programmed in advance to make a temperature drop −4° C. with respect to the reference set temperature in the next time period (t2), the first control means 4 sets the first set temperature Ta to 36° C. to control energization of the first heat generator A. Further, assuming that the first control means 4 has been programmed in advance to make a temperature drop −1° C. with respect to the reference set temperature in the third time period (t3), the first control means 4 sets the first set temperature Ta to 39° C. to control energization of the first heat generator A. In this way, by increasing or decreasing the first set temperature Ta, a general average temperature (for example, a time average value in the three time periods (t1), (t2) and (t3)) can be dropped without making a seat occupant feel much a drop in set temperature.

However, if both the first set temperature Ta and the second set temperature Tb are set to the same temperature in the same time period, when the temperature drop of the first heat generator A is large, that of the second heat generator B also becomes large, thus causing concern of a temperature drop as a whole and bringing about a possibility of a diminished sense of warmth.

In view of this, in the fluctuation control of the first heat generator A and the second heat generator B according to the present invention, the first set temperature Ta is set to be greater than the second set temperature Tb in a certain time period, and the second set temperature Tb is set to be greater than the first set temperature Ta in another time period. By way of example, assuming that a maximum value of the temperature drop of each set temperature with respect to the reference set temperature in the fluctuation control is −5° C., when the temperature drop on the side of the first control means 4 is −2° C. as in the first time period (t1) shown in FIG. 3, it is programmed in advance such that the temperature drop on the side of the second control means 5 is −3° C. (5−2=3) with respect to the reference set temperature. The temperature drop on the side of the second control means 5 is obtained, for example, by subtracting the temperature drop on the side of the first control means 4 from the maximum value of the temperature drop.

In the case where the temperature drop of the first set temperature Ta is programmed to be set to 0° C. in, for example, a time period (t4), the temperature drop of the second set temperature Tb on the side of the second control means 5 is set to −5° C. with respect to the reference set temperature.

As described above, when the temperature drop on the side of the first control means 4 is small, the temperature drop on the side of the second control means 5 is made large, and when the temperature drop on the side of the first control means 4 is large, the temperature drop on the side of the second control means 5 is made small. By doing so, if the temperature of the first heat generator A is low, that of the second heat generator B is controlled to become high, and if the temperature drop of the first heat generator A is small, the temperature of the second heat generator B is controlled to become low.

This control method makes it harder to spoil the seat-occupant's sensitivity to warmth, thereby providing a more comfortable seat heater. Also, because both the first set temperature Ta and the second set temperature Tb are controlled to be lower than the reference set temperature, the rate of energization (the rate of being energized) of the first heat generator A and that of the second heat generator B are both reduced, thus resulting in a reduction in electric power consumption.

In addition, because a seating location and a contact location with a human body are both fixed in the seat heater, unlike a planar heater such as a general electrical carpet, the above-described separation of the heat-generating elements and the fluctuation control produce a large effect.

Although in this embodiment the first heat generator A has been described as being brought into contact with highs, a central portion of a hip, a central portion of a waist, a central portion of a back, and shoulders of a human body, all of which are quick to sense warmth and show a high heating effect in response to heat supply, all of them are not necessarily brought into contact with the human body, and at least one of them may be heated if a similar effect is produced. Also, the sites of a human body to be brought into contact with the first heat generator A are not limited to the aforementioned ones if a similar effect is produced.

Although the predetermined time period in the fluctuation control has been described as being about five minutes, all the time periods may not be the same. Also, even if the fluctuation control is executed not on a time-period basis but on an on/off-cycle basis of each heat-generating element, a similar effect can be produced.

Further, the first heat generator A is placed so as to be brought into contact with those sites of a human body that are quick to sense warmth and show a high heating effect in response to heat supply, while the second heat generator B is placed so as to be brought into contact with those sites of the human body that are slow to sense warmth and accordingly insensitive to warmth, but can enhance comfort when heated. Because of this, even if the temperature drop controlled by the second control means 5 for control of heat generation is made greater than the temperature drop controlled by the first control means 4, the sensible temperature of a seat occupant does not drop easily. Accordingly, heat-generating energy can be reduced without spoiling comfort of the seat occupant, thus making it possible to provide a seat heater capable of achieving further energy saving.

Additionally, the first control means 4 and the second control means 5 control the set temperatures Ta, Tb not to exceed the reference set temperature during the fluctuation control. This can positively reduce the temperature and also the heat-generating energy, thus resulting in energy saving.

It is to be noted here that the set temperatures Ta, Tb in the fluctuation control are not limited to the above-described temperatures and may be determined by performing evaluations of seats.

(Embodiment 2)

Figure 4:
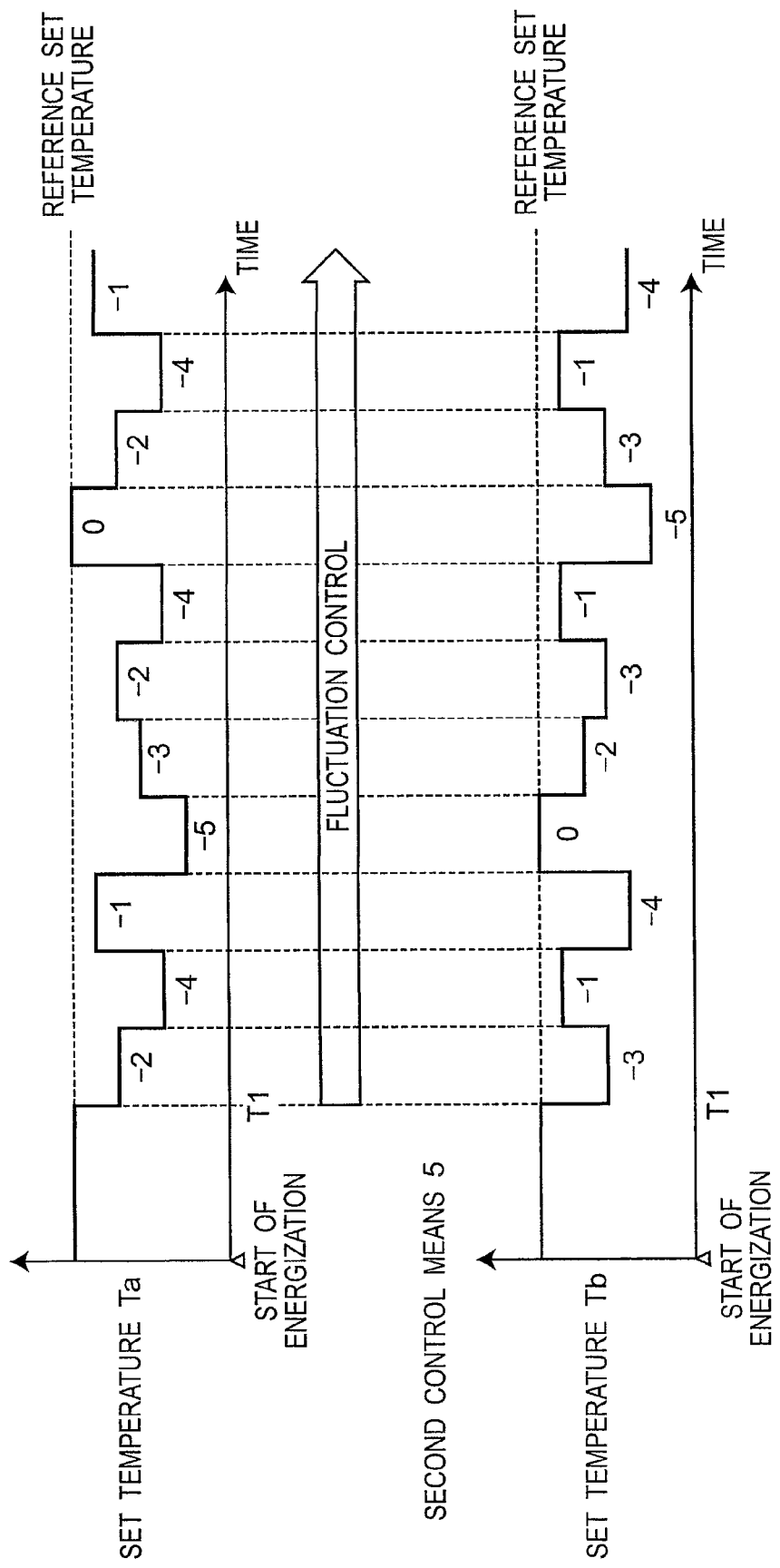
FIG. 4 is a schematic view showing an energizing control for a seat heater according to a second embodiment of the present invention.

A second embodiment of the present invention is explained hereinafter. FIG. 4 is a schematic view showing an energizing control for a seat heater according to the second embodiment of the present invention. Because the seat heater in this embodiment has the same construction as that of the seat heater in the first embodiment referred to above, FIGS. 1 and 2 are also used in the following discussion about this embodiment.

In FIG. 4, during a period from the start of energization to when a predetermined time period (time T1) elapses, the first control means 4 and the second control means 5 energize the first heat generator A and the second heat generator B, respectively, with a reference set temperature (see the first embodiment) set as a target value of the first set temperature Ta and as that of the second set temperature Tb. After the time T1 has elapsed, the first control means 4 and the second control means 5 execute the fluctuation control discussed in the first embodiment. If temperature-increasing characteristics at the start of energization are required, this control can rapidly increase the temperature, taking the reference set temperature as a target temperature, and the fluctuation control is subsequently executed after a lapse of a time period in which the temperature becomes stable. Accordingly, comfort and energy saving can be both achieved without spoiling the seat-occupant's sensitivity to warmth at the start of energization.

Although the time period until the fluctuation control is started is set to, for example, about ten minutes, the former is not limited to the latter and may be determined by performing evaluations of seats.

Further, if the fluctuation control is executed not after a lapse of the predetermined time period but after the temperature detected by the first temperature detecting means 6 has reached a predetermined temperature (for example, the reference set temperature referred to above), the seat heater can be shifted to the fluctuation control after the temperature has been positively made stable, thus making it possible to further enhance comfort and energy saving.

(Embodiment 3)

Figure 5:
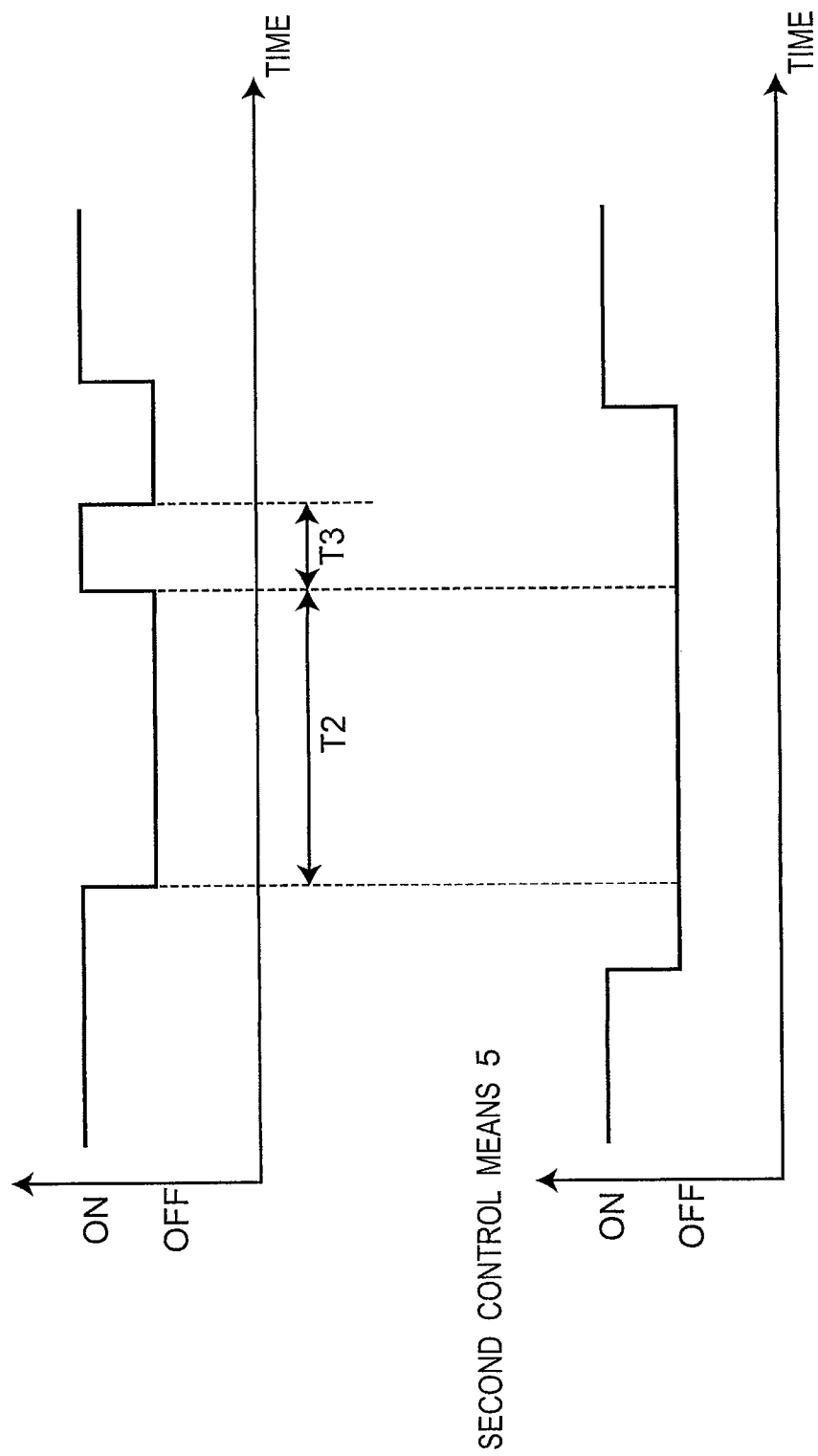
FIG. 5 is a schematic view showing an energizing control for a seat heater according to a third embodiment of the present invention.

A third embodiment of the present invention is explained hereinafter. FIG. 5 is a schematic view showing an energizing control for a seat heater according to the third embodiment of the present invention. Because the seat heater in this embodiment also has the same construction as that of the seat heater in the first embodiment, FIGS. 1 and 2 are also used in the following discussion about this embodiment.

As described above, when the first set temperature Ta and the second set temperature Tb have reached the reference set temperature, the first control means 4 and the second control means 5 turn off energization of the first heat generator A and that of the second heat generator B, respectively, and when the first set temperature Ta and the second set temperature Tb have not reached the reference set temperature, the first control means 4 and the second control means 5 maintain the energization of the first heat generator A and that of the second heat generator B, respectively. As such, a state in which both the heat generators A, B have been turned off is present. However, if heat supply to both the heat generators A, B is stopped, a human body may feel cold a little even if there is little temperature drop.

In view of this, according to this embodiment, when an off-state of both the first heat generator A and the second heat generator B continues for a predetermined time period (T2), as shown in FIG. 5, the first heat generator A for heating the sites of a human body that are quick to sense warmth and show a high heating effect in response to heat supply is forcibly energized for a predetermined time period (T3), thereby preventing the human body from feeling a temperature drop and making it possible to provide a more comfortable seat heater without spoiling the sensitivity of the human body to warmth.

The two predetermined time periods T2, T3 are respectively set to, for example, about two minutes and about ten seconds, but the former are not limited to the latter and may be determined by performing evaluations of seats.

Although the fluctuation control for increasing or decreasing the first set temperature Ta and the second set temperature Tb has been discussed in the embodiments referred to above, the changes in set temperatures Ta, Tb are the same as those in the rate of energization and, hence, a similar effect is produced even if a control for increasing or decreasing the rate of energization is executed.

INDUSTRIAL APPLICABILITY

As described above, the present invention provides a seat heater that can be used to heat an automotive seat and achieve energy saving while keeping comfort. Accordingly, the seat heater according to the present invention is also applicable to a seat of a vehicle other than automotive vehicles or to a personal home heating system.

The invention claimed is:
1. A seat heater comprising:
a first heat generator embedded in a seat;
a second heat generator embedded in the seat at a location different from the first heat generator; and a controller operable to execute a fluctuation control in which a first set temperature of the first heat generator and a second set temperature of the second heat generator are increased or decreased in each of a plurality of predetermined time periods;

wherein the controller sets the first and second set temperature by changing a temperature drop thereof with respect to a predetermined reference set temperature for each of the predetermined time periods and sets the first set temperature to be higher than the second set temperature in one of the time periods and sets the second set temperature to be higher than the first set temperature in another of the time periods.

2. The seat heater according to claim 1, wherein the first heat generator and the second heat generator are placed at different locations of the seat depending on properties of seat-occupant's sites.

3. The seat heater according to claim 1, wherein the first heat generator is placed so as to be brought into contact with at least one of thighs, a central portion of a hip, a central portion of a waist, a central portion of a back, and shoulders of a seat occupant.

4. The seat heater according to claim 1, wherein a time average value of the second set temperature in a predetermined number of the time periods is less than that of the first set temperature in the predetermined number of the time periods.

5. The seat heater according to claim 1, wherein when a non-energized state of both the first heat generator and the second heat generator continues for a predetermined first time period, the controller energizes the first heat generator for a predetermined second time period.

6. The seat heater according to claim 1, wherein the reference set temperature is a temperature arbitrarily set by a seat occupant.

7. The seat heater according to claim 1, wherein the controller executes a normal control in which the first heat generator and the second heat generator are energized with a target value of the first set temperature and that of the second set temperature set as a predetermined reference set temperature and, in the fluctuation control, each of the first set temperature and the second set temperature does not exceed the predetermined reference set value.

8. The seat heater according to claim 7, wherein the normal control is executed from start of energization of the first heat generator and the second heat generator until a predetermined time period elapses, and the fluctuation control is executed after the normal control.

9. The seat heater according to claim 7, wherein the normal control is executed until the first set temperature reaches a predetermined set temperature and the fluctuation control is executed after the normal control.

* * * * *